United States Patent
Tuunanen

(10) Patent No.: US 6,816,586 B2
(45) Date of Patent: Nov. 9, 2004

(54) CONTROLLING INTELLIGENT NETWORK SERVICES

(75) Inventor: Heikki Tuunanen, Espoo (FI)

(73) Assignee: Nokia Corporation, Espoo (FI)

( * ) Notice: Subject to any disclaimer, the term of this patent is extended or adjusted under 35 U.S.C. 154(b) by 419 days.

(21) Appl. No.: 09/983,774

(22) Filed: Oct. 25, 2001

(65) Prior Publication Data

US 2002/0041670 A1 Apr. 11, 2002

Related U.S. Application Data

(63) Continuation of application No. PCT/FI00/00354, filed on Apr. 25, 2000.

(30) Foreign Application Priority Data

Apr. 26, 1999 (FI) .................................................. 990940

(51) Int. Cl.[7] ................................................ H04M 7/00
(52) U.S. Cl. .......................... 379/221.08; 379/221.09; 379/221.1; 379/221.11; 379/221.12
(58) Field of Search .......................... 379/88.12, 88.22, 379/211.03, 221.08–221.12

(56) References Cited

U.S. PATENT DOCUMENTS 5,701,412 A    12/1997   Takeda et al.
5,878,128 A  * 3/1999   Kantola .................... 379/230
6,101,250 A    8/2000   Tiainen

FOREIGN PATENT DOCUMENTS

| WO | WO 97/36431 | 10/1997 |
| WO | WO 98/21899 | 5/1998 |
| WO | WO 99/18706 | 4/1999 |

* cited by examiner

Primary Examiner—Ahmad F. Matar
Assistant Examiner—M. C. Ubiles
(74) Attorney, Agent, or Firm—Pillsbury Winthrop LLP

(57) ABSTRACT

An intelligent network comprising service switching points (2) and at least one service control point (1), whereby for one or more call state models there are two or more service logic programs located at the service control point (1), the intelligent network being arranged to direct the call state model to a certain detection point or call phase in response to an operation sent by the intelligent network service, wherein at the service switching point at least one operation is defined, for the execution of which the service switching point can select from two or more alternative routes or detection points to which the service switching point can direct the call state model whereby the service control function is arranged to indicate the route or detection point to which the service switching point is to direct the call state model in connection with said sending of an operation.

14 Claims, 2 Drawing Sheets

CONTROLLING INTELLIGENT NETWORK SERVICES

This is a Continuation of International Application No. PCT/FI100/00354 filed Apr. 25, 2000 which designated the U.S.

BACKGROUND OF THE INVENTION

The invention relates to a method for controlling intelligent network services and to an intelligent network.

In telecommunications networks intelligence refers to the ability to access stored data, to process the data and to make decisions based on the data. Even the present telecommunications networks, such as the public switched telephone networks PSTN, are to some extent intelligent, since they are capable of processing stored data in routing a call, for instance. A typical 'intelligent' facility in present telecommunications networks is conditional call forwarding in which the call situation must be analysed and the call routed on according to the stored call forwarding service profile. Intelligent facilities of this kind have, however, so far been an inseparable part of the basic network and consequently, changing or adding facilities has required software updating, for instance, in all network switching centres.

One example of an intelligent network of this kind is described in the Q-1200 series recommendations of the ITU-T (International Telecommunications Union). The invention and its background is described using the terminology of the ETS 300 374-1 CoreINAP standard, but the invention can also be used in intelligent networks implemented according to other intelligent network standards.

An intelligent network IN is a network architecture attached to a basic network (fixed or mobile network), which enables a swifter, easier and more flexible implementation and control of services. This is done by moving the control of the services away from the switching centre to a separate intelligent network functional unit. This way, the services can be made independent of the operation of the basic network, and the structure and software of the basic network need not be altered when services are changed or added. In an intelligent network, there can be several service providers in addition to the actual network operator.

The standardisation of intelligent networks has progressed swiftly during the last few years. These standards define a certain functional and hierarchical model for an intelligent network. In this model, the control of services has been moved from the switching centre of the basic network to a service control function (SCF) or a service control point (SCP) in the intelligent network. The service control function contains the service logic and any control related to the service (for instance the necessary database and service logic programs (SLP), in other words, the computer programs which implement the logical structure of a certain service, i.e. the service logic). The service control function can be a solely logical function which can be seen as uniform from the viewpoint of a service switching point SSP. It can be implemented in various ways internally, it can be distributed internally and the service logic related to it can be distributed into different nodes. The service data can also be distributed into other network nodes than the service logic. For instance, the service control function or point (SCF/SCP) can be distributed internally so that it only provides an open interface (such as CORBA, Common Object Request Broker Architecture) to an external server provided by an external service provider. In such a case, the SCP and the external server together form the service control function. Intelligent network services are designed, tested and deleted with special equipment called the service creation environment point (SCEP). A service management function (SMF) is used to manage the data relating to the users and the network in the database, including service-specific data and service programs. The service switching point (SSP) is typically a switching centre, a switching centre of the basic network, for instance, which executes a service switching function (SSF), i.e. identifies the intelligent network service and initiates interworking with the service control point SCP, but the SSP can also be a network element of another kind, such as the node responsible for the establishment of the connection in a VoIP protocol (Voice IP), i.e. a H.323 Gatekeeper. When a call including an intelligent network service is made, the service switching point SSP takes care of the connection arrangements. The intelligent network service is provided by initiating an intelligent network service when detecting detection points (DP) related to services and defined by a call state model (BCSM) describing the call control operation, at which time the service switching point SSP requests instructions from the service control point SCP. In other words, the SSP hands over the control to the SCP and then waits for operations from the SCP. When an intelligent network service is triggered at the service control point SCP, the service logic program SLP is initiated, whose operation determines the instructions which the SCP sends to the SSP in each call phase. The SSP interprets the received instructions and begins the call control functions required by them. Triggering an intelligent network service thus refers to the initiation of an intelligent network function due to an input created when a certain identification condition is met.

The above describes the present structure of intelligent networks. In this application, intelligent network refers generally to a solution in which a node switching a call, a session or packet data contacts a service control function which provides the node in question instructions affecting the switching of the call, session or packet data. The contact between the node in question and the service control function is based on the service trigger data in the node. Triggerings, state models and a protocol providing controls or API interface between the control function and the network switching node characterize an intelligent network. Call, session or packet data switching can be described with a state model visible to the control function, the state model comprising phases and detection points associated with them, at which the processing can be interrupted to wait for instructions from the control function. Controls and operations can also be procedures directed at call objects and event notifications associated with them. In the intelligent network according to the CoreINAP (Intelligent Network Application Protocol) CS3 (Capability Set 3) being developed in the ETSI (European Telecommunication Standard Institute) SPS3 work group and the ITU, it will, according to the plans, be possible to have for one call state model several controlling connections (MPC, Multiple Point of Control support) to the service control point which correspondingly has several active service logic programs. It should be noted that the invention can be applied to an intelligent network according to any intelligent network standard (such as ANSI, AIN or WIN) providing MPC support. If the service logic programs activated for one call state model are completely independent, they do not necessarily have any knowledge of each others existence. Because of this, a ReleaseCall operation sent by one intelligent network service is, according to the preliminary CS-3 standard, meant to be visible as detection of a detection point to other intelligent network services active at the same time in the same call state model. The detection point being detected in the state model is determined according to the cause code value given in the ReleaseCall operation to be a Busy or Disconnect detection point, for instance. This way, the SCP can make the call state model to proceed to the desired detection point by means of a ReleaseCall operation which originally was meant only to release a call.

A problem with the above arrangement is that binding the detection point to a cause code value is not always appropriate, since then the used cause codes and detection points are fixed to each other. Then the intelligent network service can not always use the cause codes it wants when releasing a call, because their use could cause an unwanted detection of a detection point.

BRIEF DESCRIPTION OF THE INVENTION

It is thus an object of the invention to develop a method and an arrangement implementing the method in order to solve the above problems. The object of the invention is achieved by a method for controlling intelligent network services in an intelligent network comprising service switching points and at least one service control point, whereby for one or more call state models describing the call control operation of a certain call and located at a service switching point, there are two or more service logic programs associated with the service control function, each executing a certain intelligent network service and controlling the operation of the service switching point during the different phases of said call, the method comprising a step in which the call state model is directed to a certain detection point or call phase in response to an operation sent by the intelligent network service, the method being characterized by defining at the service switching point at least one operation, for the execution of which the service switching point can select from two or more alternative routes or detection points to which the call state model can be directed, and by indicating from the service control function in connection with said sending of an operation the route or detection point to which the call state model is directed.

The invention is based on the idea that, when necessary, a phase (phases) is arranged to the call state model, in which phase the service switching point can select from two or more alternative routes or detection points to execute a certain operation (command). The detection point or branch to which the state model of the session is to be directed in each situation, is added as its own parameter (information) to the operation (ReleaseCall or DisconnectLeg, for instance). It is also possible to use a separate operation whose type indicates the desired detection point. In this application, the term 'call' refers not only to a conventional call, but also to other, possibly virtual, connection states comprising conveying of user data, such as a data session or conveying of packet data. Examples include a packet radio session (such as a GPRS session), a VoIP session and a multimedia session according to the H.323.

The method of the invention provides the advantage that by adding to the state model a branching point (points) in which the route executing a certain operation or the next detection point is selected conditionally according to the type or content of the operation received from the service control function, the detection point can be freely defined, and on the other hand, by using a certain operation reserved for this purpose, it is possible to achieve the detection of a certain detection point only and not necessarily the release of the call, for instance. The service switching point thus has the possibility to select the route or the next detection point in a state model in several ways so that the route to be selected is not explicit on the basis of the information at the service switching point, but the service control function indicates the route or the detection point to be selected by means of the content of the sent operation. This way, an intelligent network service can also force the state model to a route which is not according to the normal operation transition rules of a state model.

According to a preferred embodiment of the invention, the selection of a route (more generally, the subset of states in the state model, to which the routine has proceeded) or a detection point for an intelligent network service affects, for instance limits, the operation of other services using the same state model at the service switching point. The route (the subset of states) can for instance have spontaneous user interaction, or calculation control may be forbidden. The sent operation may, for instance, comprise at least one additional parameter which indicates what the other intelligent network services using the same call state model can do or what they have to do at the detection point to which the call state model is directed as a result of sending the operation. This preferred embodiment solves the problem, for instance, which arises when in an intelligent network using several controlling intelligent network services a control made by one controlling connection to the call state results in that the other services are to operate in a manner differing from the original operation at the detection points detected later on. According to its primary and preferred embodiments, the invention facilitates the feature interaction management between various intelligent network services by increasing the ways to control the call state model without losing the service-specific control on what finally happens to the call. The subset of states can also be indicated by means of a state parameter, whereby the actual state is formed of the identifier of a more common state and of a 'sub-state' set by a network sub-service, for instance 'call state'+'connection element separation forbidden'.

The invention also relates to an intelligent network comprising service switching points and at least one service control point, whereby for one or more call state models describing the call control operation of a certain call and located at a service switching point, there are two or more service logic programs located at the service control point, each executing a certain intelligent network service and controlling the operation of the service switching point during the different phases of said call, the intelligent network being arranged to direct the call state model to a certain detection point or call phase in response to an operation sent by the intelligent network service, the intelligent network being characterized in that at the service switching point at least one operation is defined, for the execution of which the service switching point can select from two or more alternative routes or detection points to which the service switching point can direct the call state model, and that the service control function is arranged to indicate the route or detection point to which the service switching point is to direct the call state model in connection with said sending of an operation.

The advantages provided by the method of the invention can be achieved by means of such an intelligent network.

BRIEF DESCRIPTION OF THE FIGURES

In the following, the invention will be described in greater detail by means of preferred embodiments and with reference to the attached drawings, in which.

DETAILED DESCRIPTION OF THE INVENTION

Figure 1:
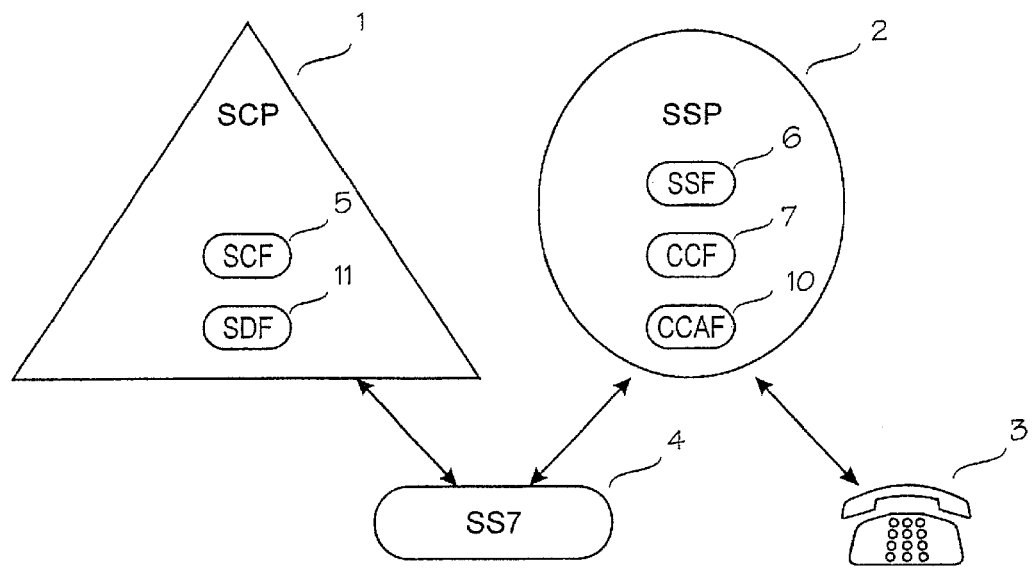
FIG. 1 shows the structure of an intelligent network.
Figure 2:
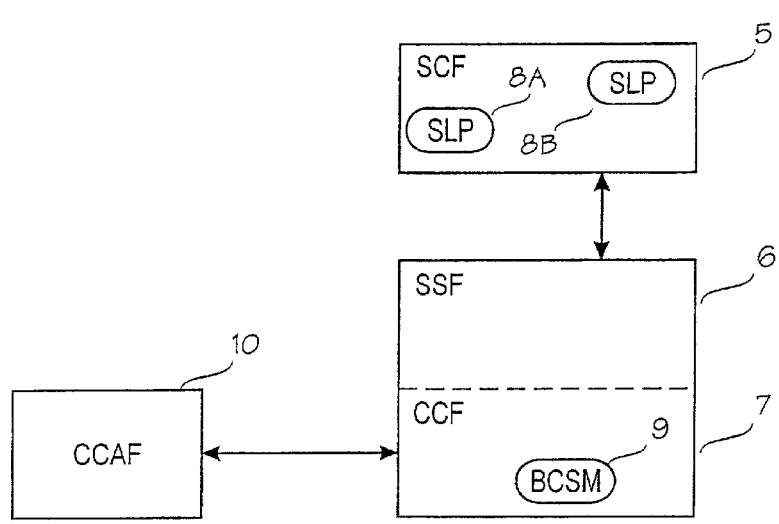
FIG. 2 shows the connections between the functions of the intelligent network.

FIG. 1 shows the elements and functions essential for the intelligent network services, and FIG. 2 shows the interconnection of the intelligent network functions. It should be noted that the figures only show the elements necessary for understanding the invention. The structure of the intelligent network may also differ from the above without any relevance to the basic idea of the invention. Network elements comprising a service switching function 6 (SSF) and a call control function 7 (CCF) are referred to as service switching points 2 (SSP). The call control function CCF 7 is not a function related to the intelligent network, but a standard switching centre function comprising high-level call processing functions of the switching centre, such as transmission link set-up and release. The service switching function SSF 6 is an interface between the call control function CCF 7 and the service control function SCF 5. The SSF 6 interprets the requests sent by the SCF 5 and forwards them to the CCF 7 which starts the call control functions required by them. Correspondingly, the call control function CCF 7 uses the SSF 6 to request instructions from the SCF 5. The SSF 6 has a fixed connection to the CCF 7 and acts as its interface. Thus, each SSF 6 is together with the CCF 7 in the same switching centre. The service switching point SSP 2 in FIG. 1 is, for instance, an exchange comprising not only the CCF 7 and the SSF 6, but also a function 10 (CCAF, Call Control Agent Function) providing users 3 access to the network. Since the SSP 2 comprises the CCAF 10, it can, for instance,. be a local exchange of a fixed network or a mobile switching centre controlling the base station subsystem BSS of a mobile network PLMN. The terminal equipment of the user 3 can thus be a telephone, a company exchange with telephones or a mobile station communicating over an air interface and its supporting equipment.

Network elements comprising a service control function 5 (SCF) are referred to as service control points 1 (SCP). The service control function 5 is a centralised authority in the intelligent network comprising an execution environment for service logic programs 8A and 8B, for instance. Each program 8A and 8B can have several instances to execute. The service control point SCP 1 in FIG. 1 may in addition to the service control function SCF 5 also comprise a service data function 11 (SDF), for instance. The SDF 11 is a database used through the SCF 5. The service logic programs 8A and 8B can request and update the data in the SDF 11. Subscriber-specific or service number-specific data, for instance, can be stored in the SDF 11.

One service control point SCP 1 can have several service switching points SSP 2 connected to it and correspondingly, one service switching point SSP 2 can be connected to several service control points SCP 1. Several SCPs 1 can contain the same service logic programs 8A and 8B and the same data or a connection to the same data to improve the reliability of the network and to divide the load of the network.

In some network nodes, the service switching point SSP and the service control point SCP have been combined. This kind of a network node is called a service switching and control point SSCP (not shown in figures). It comprises both the SSP and SCP functions and provides similar services as the corresponding individual points together.

In the system of FIG. 1, the elements are connected to each other through a signalling network SS7 4 (Signalling System Number 7, a known signalling system described in the CCITT (currently ITU-T) recommendations). Other networks, such as the ISDN, can also be used. In communicating with each other, the switching point 2 and the control point 1 use, for instance, the INAP protocol (Intelligent Network Application Protocol, described in the ETSI standard ETSI IN CS1 INAP Part 1: Protocol Specification, prETS 300 374-1). In the SS7 protocol stack, the INAP layer is the top one with the TCAP layer (Transaction Capabilities Application Part), the SCCP layer (Signalling Connection Control Point) and the MTP layer (Message Transfer Part) below it.

When a call including an intelligent network service is set up, the service switching point SSP 2 takes care of the connection arrangements. The intelligent network service is provided by initiating an intelligent network service when detecting detection points (DP) related to services, at which time the service switching point SSP 2 requests instructions from the service control point SCP 1. In other words, the SSP 2 hands over the control to the SCP 1 and then waits for operations from the SCP 1. When an intelligent network service is triggered, the service control point SCP 1 initiates the service logic program SLP 8A or 8B whose operation determines the instructions which the SCP 1 sends to the SSP 2 in each call phase. The SSP 2 interprets the received instructions and begins the call control functions required by them. Triggering an intelligent network service thus refers to the initiation of an intelligent network function due to an input created when a certain identification condition is met, i.e. intelligent network services are initiated at the detection points set to trigger detection points (TDP) and defined by the basic call state model 9 (BCSM) describing the call control operation. When a certain intelligent network service has already been initiated, it can further set detection points to event detection points (EDP) whose detection causes an operation, for instance, in the intelligent network service in question.

In the intelligent network according to the CoreINAP CS3 being developed in the ETSI SPS3 work group and the ITU, it will, according to the plans, be possible to have for one call state model 9 several controlling connections (MPC, Multiple Point of Control support) to the service control point 5 which correspondingly has several active service logic programs 8A and 8B. The service logic programs 8A and 8B activated for one call state model 9 can be completely independent and may not have any knowledge of each others existence. Therefore, it may be necessary to inform other intelligent network services simultaneously active in the same call state model 9 about the functions executed by one intelligent network service. This can be done, for instance, by having an intelligent network service to cause the detection of a detection point in the call state model 9 when executing an operation. If the other intelligent network services have set the detection point in question to an event detection point, this event will be noticed by them because it creates an Event Detection Point request (EDP-R). Detecting a detection point can also initiate an intelligent network service, if the detection point has been set to a trigger point for the intelligent network service.

According to a primary embodiment of the invention, the call state model 9 is directed to a certain detection point in response to an operation sent by an intelligent network service so that the detection point to which the call state model 9 is directed is determined according to the type of said operation or according to a parameter reserved for defining the detection point associated with said operation. The parameter defining the desired detection point can be associated to any normal operation of the system (ReleaseCall or DisconnectLeg, for instance) or to an operation meant solely to arrange the detection of a certain detection point. The use of a special operation reserved for a certain purpose is justified, because using the ReleaseCall operation, for instance, for two purposes, to release the call and, on the other hand, to report the desired detection point, is not necessarily sensible. If the intelligent network service expressly wants to release the call, it does not necessarily want to provide other services with a possibility to affect the call. On the other hand, if the main objective is only to 'run' the call state model 9 to a certain detection point (for instance, the service wants to have the B subscriber reported as busy or in a 'no answer' state), the purpose is to let the call to react like it normally does when the event in question occurs in the network, to initiate call forwarding controlled by the intelligent network service (or a GSM supplementary service), for instance, in which case it is not necessary to know whether the call is to be released or not. If a special operation is used only to report the desired detection point, the detection point can also be indicated on the basis of the type of the operation without any specific parameter.

According to a preferred embodiment of the invention, said operation, by means of which the call state model 9 is directed to a certain detection point, also comprises at least one parameter indicating what the other intelligent network services using the same call state model 9 can do or what they have to do at the detection point to which the call state model 9 is directed as a result of sending the operation. By means of this preferred embodiment of the invention, it is possible to avoid the problems possibly caused by detecting a detection point (the ReleaseCall operation, for instance, is originally meant to be used in releasing a call). Detecting a detection point may, for instance, cause an unwanted call rerouting by another simultaneously active service at a detection point which was detected because of a ReleaseCall operation. For instance, a ReleaseCall request made by a PrePaid service to release a call may cause the detection of a Disconnect detection point and a controlling intelligent network service simultaneously active at the Disconnect detection point may make a continuation call, i.e. route the call to a new number. Such an unfavourable situation can thus be avoided by defining, for instance with a parameter associated with the operation, what other intelligent network services can do at the detected detection point.

Figure 3:
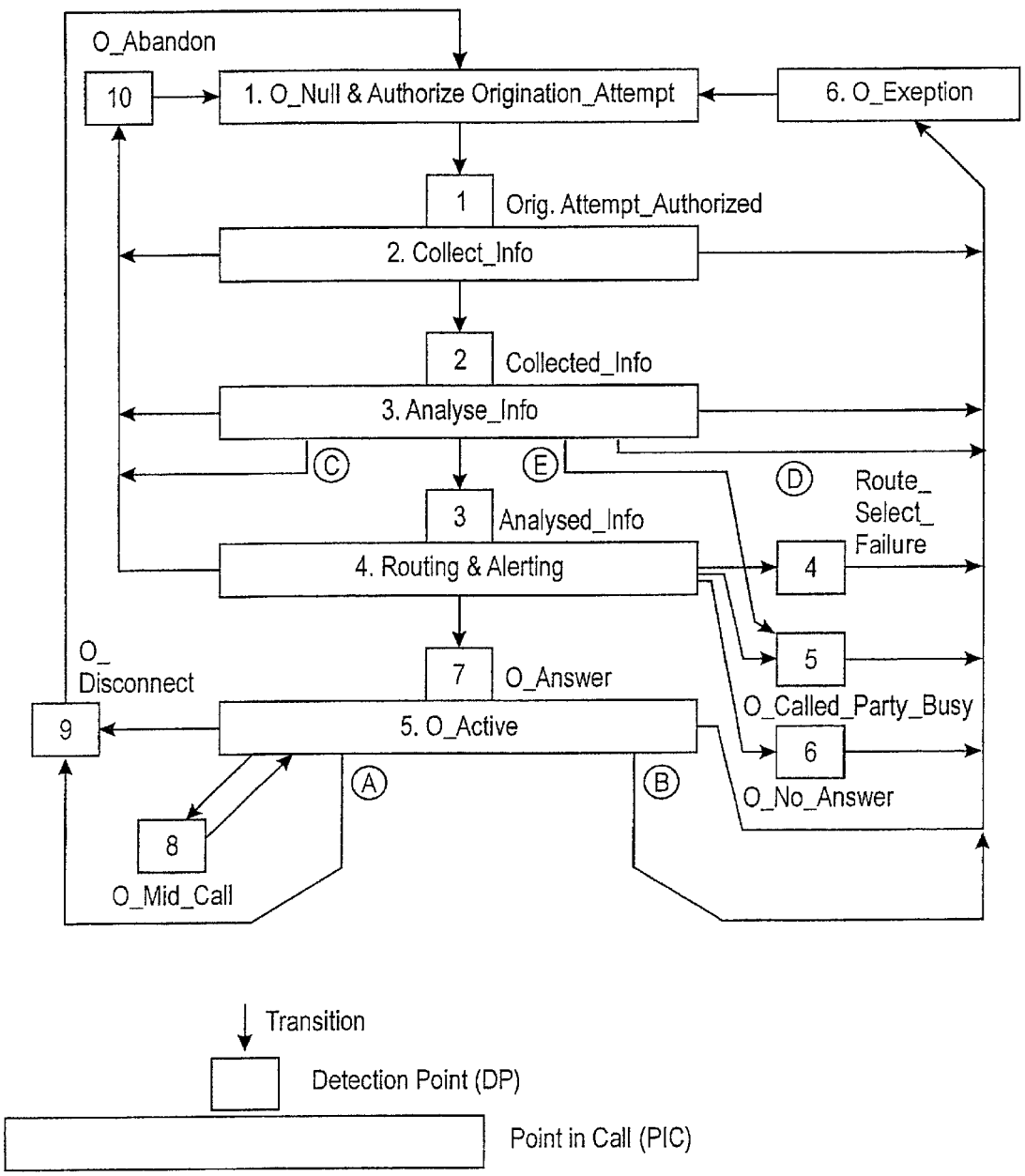
FIG. 3 shows the state model of an outgoing call.

FIG. 3 shows a basic call state model BSCM of an outgoing call, defined in the ITU-T recommendation Q.1214 (Figure 4-3). The following provides a few examples on how a ReleaseCall operation can control the state model in various ways when the values of the controlling parameters change.

EXAMPLE 1

Let us assume that the call is in conversation state (O_Active in FIG. 3). The content of the ReleaseCall operation sent by the SCP can, for instance, either command to detect the Disconnect detection point 9 (route A) or forbid the detection of the Disconnect detection point (in which case the alternate route B is selected).

EXAMPLE 2

Let us assume that the call is in analysis state (Analyse_Info in FIG. 3). The content of the ReleaseCall operation sent by the SCP can, for instance, either command to detect the Abandon detection point 10 (route C), forbid the detection of detection points (route D) or command to detect the Busy detection point 5 (route E).

It is obvious to a person skilled in the art that while technology advances, the basic idea of the invention can be implemented in many different ways. The invention and its embodiments are thus not restricted to the examples described above, but can vary within the scope of the claims.

What is claimed is:

1. A method for controlling intelligent network services in an intelligent network comprising service switching points and at least one service control function, whereby for one or more call state models describing the call control operation of a certain call and located at a service switching point, there are two or more service logic programs associated with the service control function, each executing a certain intelligent network service and controlling the operation of the service switching point during the different phases of said call, and wherein the call state model is directed to a certain detection point or call phase in response to an operation sent by the intelligent network service, the method comprising the steps of:

defining at the service switching point at least one operation, for the execution of which the service switching point can select from two or more alternative routes or detection points to which the call state mode can be directed; and indicating from the service control function in connection with said sending of an operation the route or detection point to which the call state model is directed.

2. A method as claimed in claim 1, wherein the route or detection point to which the call state is directed, is determined according to the content of said operation, for instance according to a parameter reserved for defining the detection point associated with said operation or some other information.

3. A method as claimed in claim 1 or 2, wherein the selection of route or detection point for said intelligent network service affects the operation of other services using the same state model.

4. A method as claimed in claim 1 or 2, wherein the route indicated by the service in the state model sets limitations to the operation of other services using the same state model.

5. A method as claimed in claim 1 or 2, wherein said operation also comprises at least one parameter or information which indicates what the other intelligent network services using the same call state model can do or have to do at the detection point to which the call state model is directed as a result of the sending of the operation.

6. A method as claimed in claim 1 or 2, wherein said operation is an operation releasing a call.

7. A method as claimed in claim 1 or 2, wherein said operation is an operation releasing a connection element.

8. An intelligent network comprising:

service switching points; and at least one service control point, whereby for one or more call state models describing the call control operation of a certain call and located at a service switching point, there are two or more service logic programs located at the service control point, each executing a certain intelligent network service and controlling the operation of the service switching point during the different, phases of said call;

the intelligent network being arranged to direct the call state model to a certain detection point or call phase in response to an operation sent by the intelligent network service;

at the service switching point at least one operation is defined, for the execution of which the service switching point can select from two or more alternative routes or detection points to which the service switching point can direct the call state model, whereby the service control function is arranged to indicate the route or detection point to which the service switching point is to direct the call state model in connection with said sending of an operation.

9. An intelligent network as claimed in claim 8, wherein the route or detection point to which the call state model is directed, is determined according to the content of said operation, for instance according to a parameter reserved for defining the detection point associated with said operation or some other information.

10. An intelligent network as claimed in claim 8 or 9, wherein the selection of route or detection point for said intelligent network service affects the operation of other services using the same state model at the service switching point.

11. An intelligent network as claimed in claim 8 or 9, wherein the route indicated by the service in the state model sets limitation to the operation of the other services using the same state model at the service switching point.

12. An intelligent network as claimed in claim 8 or 9, wherein said operation also comprises at least one parameter or other information indicating what the other intelligent network services using the same call state model can do or have to do at the detection point to which the call state model is directed as a result of the sending of the operation.

13. An intelligent network service as claimed in claim 8 or 9, wherein said operation is an operation releasing a call.

14. An intelligent network service as claimed in claim 8 or 9, wherein said operation is an operation releasing a connection element.

* * * * *